(12) United States Patent
Crutchfield

(10) Patent No.: US 7,862,288 B2
(45) Date of Patent: Jan. 4, 2011

(54) HAY BALE ACCUMULATING METHOD AND DEVICE

(76) Inventor: Stephen E. Crutchfield, 6468 Wolf Pond Rd., Bascom, FL (US) 32423

( * ) Notice: Subject to any disclaimer, the term of this patent is extended or adjusted under 35 U.S.C. 154(b) by 350 days.

(21) Appl. No.: 12/150,775

(22) Filed: Apr. 30, 2008

(65) Prior Publication Data

US 2009/0274546 A1    Nov. 5, 2009

(51) Int. Cl.
| | |
|---|---|
| *A01D 90/08* | (2006.01) |
| *A01D 75/04* | (2006.01) |
| *B65H 27/00* | (2006.01) |
| *B65G 61/00* | (2006.01) |

(52) U.S. Cl. .................. 414/801; 414/111; 414/437; 56/475

(58) Field of Classification Search ............... 198/410, 198/436, 442, 451; 414/111, 132, 24.5, 24.6, 414/25, 546, 789.7; 56/473.5, 474–477
See application file for complete search history.

(56) References Cited

U.S. PATENT DOCUMENTS 4,053,064 A * 10/1977 Stewart .................. 414/111

2004/0223833 A1 * 11/2004 Kuhns .................... 414/111
2007/0217893 A1 * 9/2007 Parrish ................... 414/111

FOREIGN PATENT DOCUMENTS

| DE | 2730636 A | * | 1/1979 |
|---|---|---|---|
| EP | 9541 A2 | * | 4/1980 |
| GB | 2054452 A | * | 2/1981 |
| GB | 2231528 A | * | 11/1990 |

* cited by examiner

*Primary Examiner*—Gregory W Adams
(74) *Attorney, Agent, or Firm*—J. Wiley Horton

(57) ABSTRACT

A bale accumulator and method in which a plurality of hay bales can be accumulated and arranged into a cluster of ten bales (a "ten stack"). The accumulator first collects a bale in each of two angled bale receivers at the rear of the accumulator. These remain in position as four columns having two bales each are collected in a more forward collection. The result is two angled bales being dragged to the rear of a conventional "eight stack." As the device releases all ten bales, gate mechanisms rotate the two rear bales 90 degrees so that they lie transverse to the eight bales comprising the "eight stack." The two rear bales are pressed against the rear of the eight stack in order to form a ten stack.

17 Claims, 11 Drawing Sheets

HAY BALE ACCUMULATING METHOD AND DEVICE

MICROFICHE APPENDIX

Not Applicable

BACKGROUND OF THE INVENTION

1. Field of the Invention

This invention relates to the field of agriculture. More specifically, the invention comprises a method and device for accumulating hay bales and arranging them into a compact cluster of ten bales.

2. Description of the Related Art

The inventor of the present invention has created prior bale accumulating devices. One such device is shown in FIG. 1. Bale accumulator 10 is designed to arrange eight hay bales into a compact cluster. The machine is designed to work with "square bales." Square bales are actually rectangular. FIG. 1B shows a typical square bale. The hay is compressed by the baler and bound together using two loops of baling twine 7. The orientation shown represents how the bale is deposited on the ground by the baler. "W" is the width (along short side 112), "H" is the height, and "L" is the length (along long side 110). While the actual dimensions vary, good approximate dimensions for a modern square bale are a height of 14 inches, a width of 18 inches, and a length of 36 inches. Those skilled in the art will know that the length of the bale is generally variable. However, for use in the present invention, it is helpful to set the length equal to twice the width. Thus, a bale having a length of 36 inches is preferable.

A square baler picks up cut hay and compresses it into bales which are then tied. The completed bales exit the rear of the machine and are deposited on the ground. The 18 inch side rests on the ground. The bales are randomly oriented, with the long axes typically being very roughly aligned with the baler's direction of travel.

The hay bales rest on a field of cut stubble. This is significant, because it means that the bales can be dragged along the field with relatively little friction and without destroying or significantly dirtying the bales. This dragging action is central to the present invention, as will now be explained.

FIG. 1 shows prior art bale accumulator 10. Chassis 12 consists of a number of box-section steel members welded together. The chassis' weight is supported by a pair of main wheels 18 near the rear and pair of castor wheels 16 at the front. The castor wheels are free to pivot. Tow bar 14 attaches to the front of the chassis. It connects the bale accumulator to a towing vehicle such as a tractor or large ATV.

Input chute 24 is located on the front of the accumulator. It receives square bales and directs them into the interior of chassis 12. It is important for the reader to realize that the bottom of the bale accumulator is open (including the bottom of the input chute). The accumulator gathers the hay bales and drags them along the field as it arranges them into a cluster. However, at no point does the accumulator lift a hay bale clear of the ground. Thus, all the components (input chute, gates, etc.) are open on the bottom.

Once a bale passes through input chute 24, a series of gates directs it into first chute 26, second chute 28, third chute 30, or fourth chute 32. The rear of each of the four chutes is open. However, stop gate 20 customarily closes the open end of the four chutes. Stop gate 20 pivots upward about pivot joint 22 to release the bales stored within the chassis at the appropriate time.

The bale accumulator includes several bale sensor assemblies. Forward bale sensor assembly 34 senses the presence of a bale passing through the forward portion of the chassis. Rear bale sensor assembly 36 senses a bale passing through the central part of the chassis. The bale sensor assemblies control the operation of the gates, which direct the bales into the appropriate chute. The term "bale sensor assembly" encompasses many different possibilities. In the embodiment shown, each sensor assembly has one or more sensor arms 35 protruding downward into the path of the hay bales. A passing bale will push this sensor arm upward. The bale sensor assembly can be a group of purely mechanical components which move the gates in the appropriate fashion. On the other hand, the bale sensor assembly could be optical or electronic sensors which are used to control pneumatic, hydraulic, electrical, or other actuators to move the gates. Because the bale accumulator operates in a relatively hostile environment, the use of purely mechanical components is preferable. The motion of the gates is preferably produced by mechanical links and levers as well.

FIG. 2 shows a simplified plan view of the bale accumulator. It is shown with tow bar 14 connected to hitch 59 on towing vehicle 57. The reader will appreciate how the offset nature of the tow bar allows the towing vehicle to pass by bale 56 while maneuvering to direct bale 56 into input chute 24. Input chute 24 flares in the forward direction to ensure that each bale is collected.

Three gates control the destination of each bale taken into the accumulator. Primary gate 38 pivots between right position 52 (shown as solid in FIG. 2) and left position 54. Two more gates are located immediately behind the position of primary gate 38. These are left gate 40 and right gate 42 (The terms "left" and "right" are based on the assumption that the observer is facing in the direction the bale accumulator is intended to travel). Left gate 40 pivots between closed position 48 (shown in the view) and open position 50. Right gate 42 likewise pivots between closed position 44 (shown in the view) and open position 46.

Several fixed guiding walls are also provided to appropriately arrange the bales. Left guide 58 runs from the middle region of the chassis up to one edge of input chute 24. Right guide 60 lies in a similar position on the right side of the chassis. The rear portion of the chassis is divided by guiding walls into four chutes (first chute 26, second chute 28, third chute 30, and fourth chute 32). Stop gate 20 selectively closes the rear extreme of the four chutes.

The operation of the gates and guiding walls will now be explained with respect to FIG. 3. FIG. 3 depicts the accumulator as stationary and the bales moving. The reader should bear in mind that these views are taken from the perspective of the moving accumulator. In actuality, the bales remain in the same general area on the ground as they are being collected by the accumulator moving over them. The reader should also bear in mind that the sequencing of the gates depicted in FIG. 3 is one option among many possibilities. Thus, it should be viewed as exemplary.

In FIG. 3(A), primary gate 38 is in right position 52. As the bale passes through the input chute it is directed via left guide 58 and primary gate 38 toward the left side of the chassis. At this point the bale encounters left gate 40, which is in open position 50. The bale is thereby guided into second chute 28. The bale travels to the rear of the chute where it is caught by stop gate 20. The stop gate then drags the bale along the ground at the same speed as the rest of the accumulator.

Once the bale passes through primary gate 38, the primary gate shifts to left position 54, as shown in FIG. 3(B) (The primary gate preferably shifts position with the passage of each bale). The next bale is thereby guided to the right side of the chassis, where it encounters right gate 42 in open position 46. The bale is thereby directed into third chute 30, where it will travel rearward until being arrested by the stop gate.

The passage of the second bale loaded again shifts the position of primary gate 38. The primary gate shifts to right position 52, as shown in FIG. 3(C). The third bale next encountered passes through the primary gate and then to left gate 40, which is again in open position. The third bale is thereby directed into second chute 28, where it comes to rest against the first bale collected.

The passage of the third bale shifts primary gate 38 to left position 54 as shown in FIG. 3(D). The fourth bale encountered is thereby directed to the right side of the chassis. Right gate 46 then directs it into third chute 30, where it comes to rest against the second bale collected. At this point, the second and third chutes have been filled. The bale sensor assemblies detect the presence of the first four bales (either by their presence in the chutes or their passage into the chutes). Thus, the accumulator should next load bales into the first and fourth chutes. In order to do this, the left and right gates must be activated.

FIG. 3(E) shows the accumulator as it encounters and stores the fifth bale. Primary gate 38 has cycled back to right position 52. However, left gate 40 has now been pivoted to closed position 48. This action propels the fifth bale down a corridor created by left gate 40 and left guide 58. The fifth bale will be propelled into first chute 26, where it will be arrested by stop gate 20.

FIG. 3(F) shows the passage of the sixth bale. Primary gate 38 is in left position 54. Right gate 42 cycles to closed position 44, which propels the sixth bale into fourth chute 40. FIG. 3(G) shows the passage of the seventh bale. The primary gate is in right position 52 and left gate 40 pivots to closed position 48. These actions drive the seventh bale into first chute 26, where it comes to rest against the fifth bale collected.

FIG. 3(H) shows the passage of the eighth bale. The primary gate is in left position 54, while right gate 42 cycles to closed position 44. These actions direct the eighth bale into fourth chute 40, where it comes to rest against the sixth bale collected.

The prior art accumulator illustrated is designed to collect eight bales and deposit them in an ordered cluster. Thus, when the last bale arrives in the position shown in FIG. 3(H), the bale sensor assemblies detect that the accumulator is full and ready to dispense. Stop gate 20 is then released and allowed to pivot upward around pivot joints 22. The eight bales thus collected slide out the back of the accumulator and are left in four columns having two bales apiece. This arrangement is referred to as an "eight stack." The reader should bear in mind that the order of accumulating the bales (such as the first bale being directed into the second chute) is largely arbitrary. The machine could be configured to collect the bales in a different order, so long as four columns of two bales result.

An "eight stack" can be picked up by a hay grapple or similar device on the front end loader of a tractor. The eight stack can then be deposited as a unit into a trailer or barn. Thus, the use of the prior art accumulator allows the bales to be collected in clusters of eight rather than individually. This feature saves considerable time.

The prior art hay accumulator is useful and efficient. However, it is limited to the creation of "eight stack" clusters. These are not suitable for some applications. In certain applications, it is preferable to create a cluster of ten bales. This "ten stack" cluster makes more efficient use of certain storage geometries. The present inventive device and method is able to produce the desired "ten stack" cluster.

BRIEF SUMMARY OF THE PRESENT INVENTION

The present invention comprises a bale accumulator and method in which a plurality of hay bales can be accumulated and arranged into a cluster of ten bales (a "ten stack"). The accumulator first collects a bale in each of two angled bale receivers at the rear of the accumulator. These remain in position as four columns having two bales each are collected in a more forward collection. The result is two angled bales being dragged to the rear of a conventional "eight stack." As the device releases all ten bales, gate mechanisms rotate the two rear bales 90 degrees so that they lie transverse to the eight bales comprising the "eight stack." The two rear bales are pressed against the rear of the eight stack in order to form a ten stack.

Figure 1:
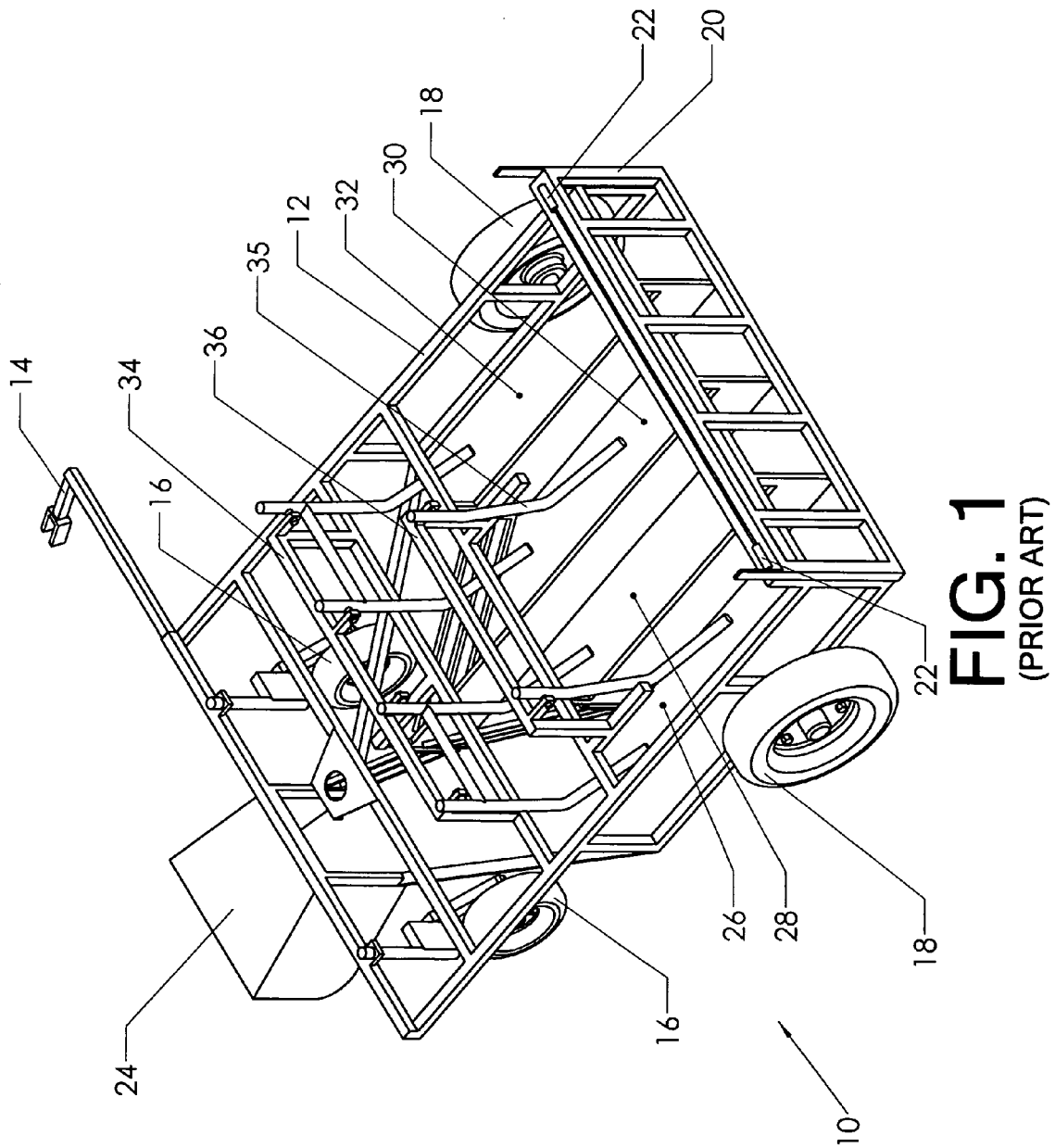
FIG. 1 is a perspective view, showing a prior art bale accumulator.
Figure 1B:
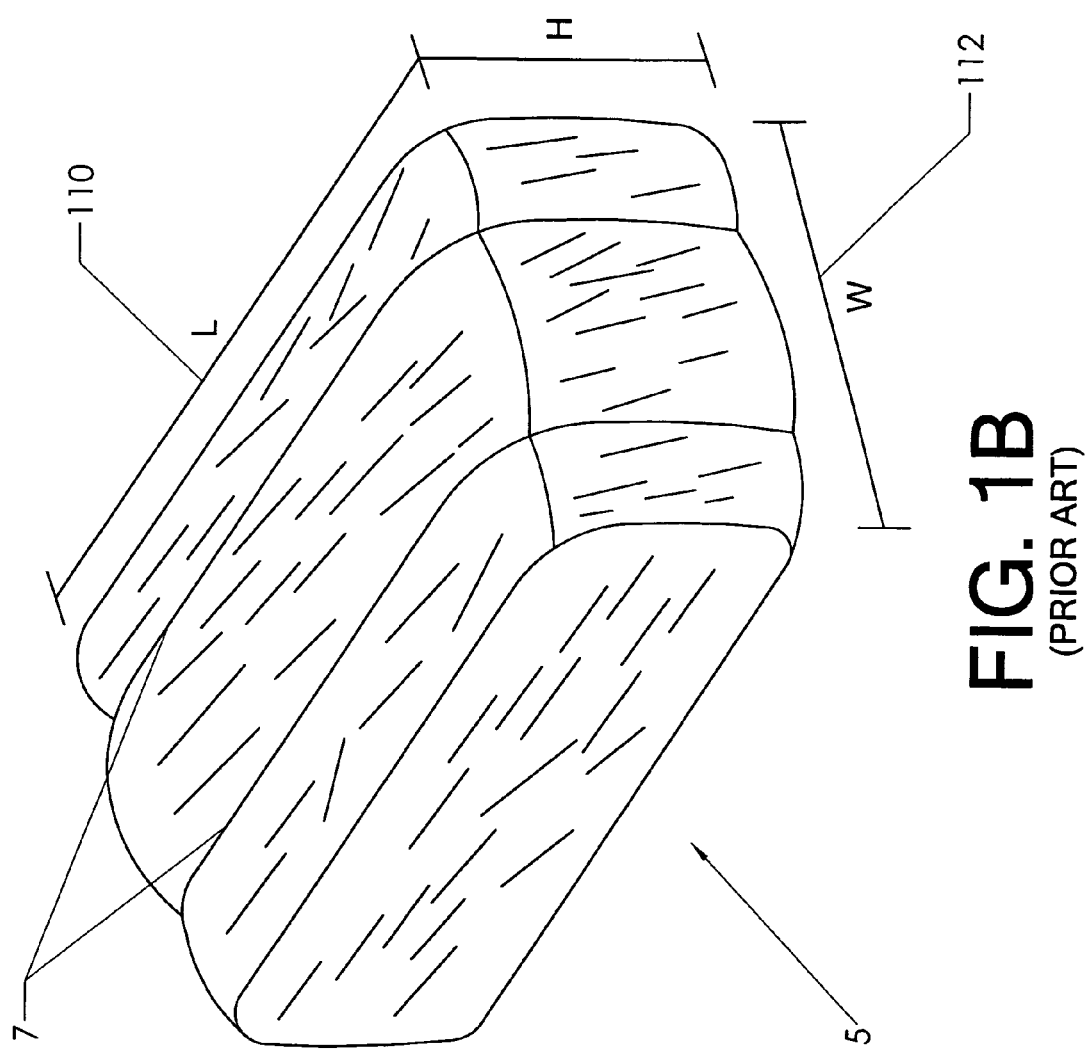
FIG. 1B is a perspective view, showing a prior art hay bale.
Figure 2:
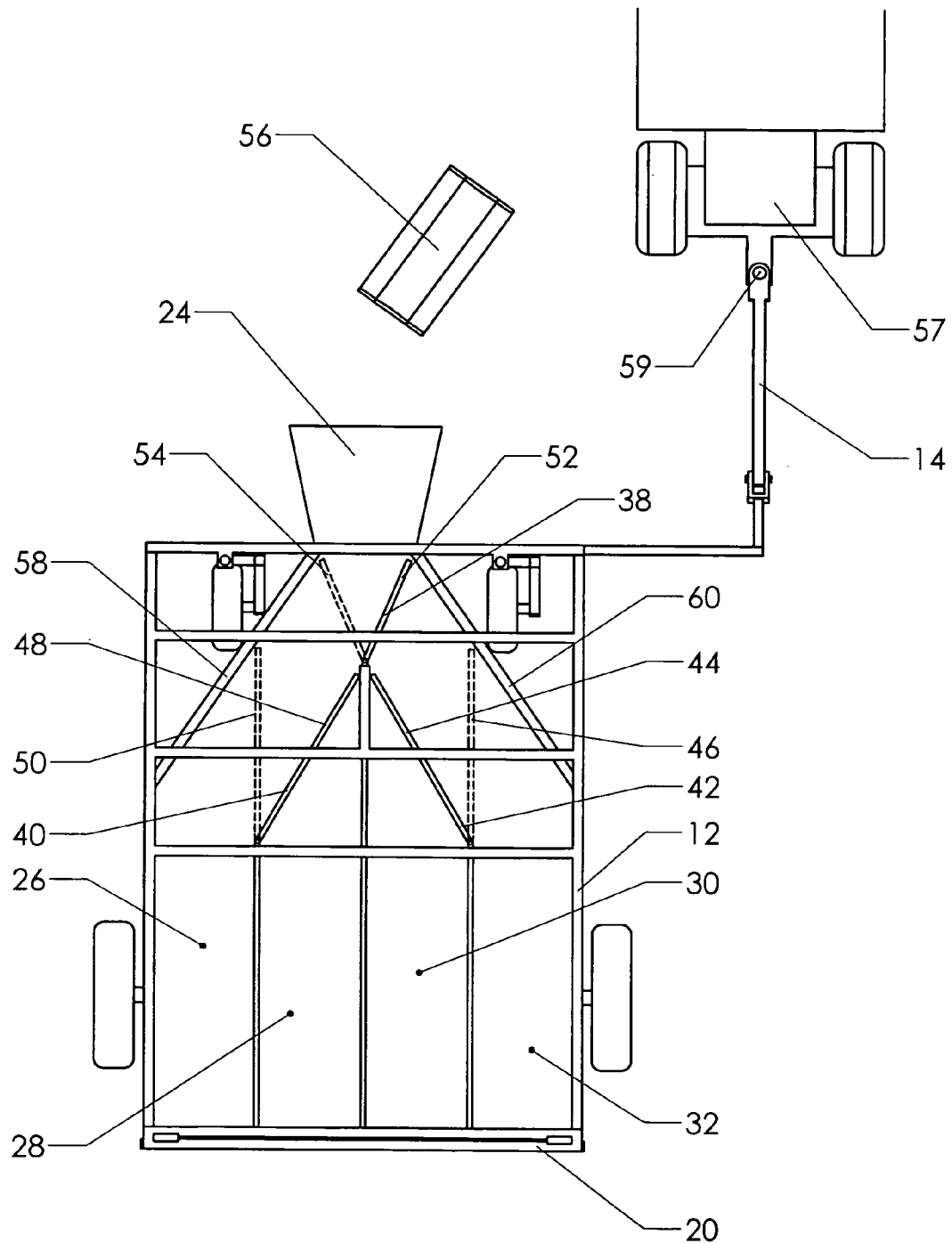
FIG. 2 is a plan view, showing a prior art hay accumulator being towed by a vehicle.
Figure 3:
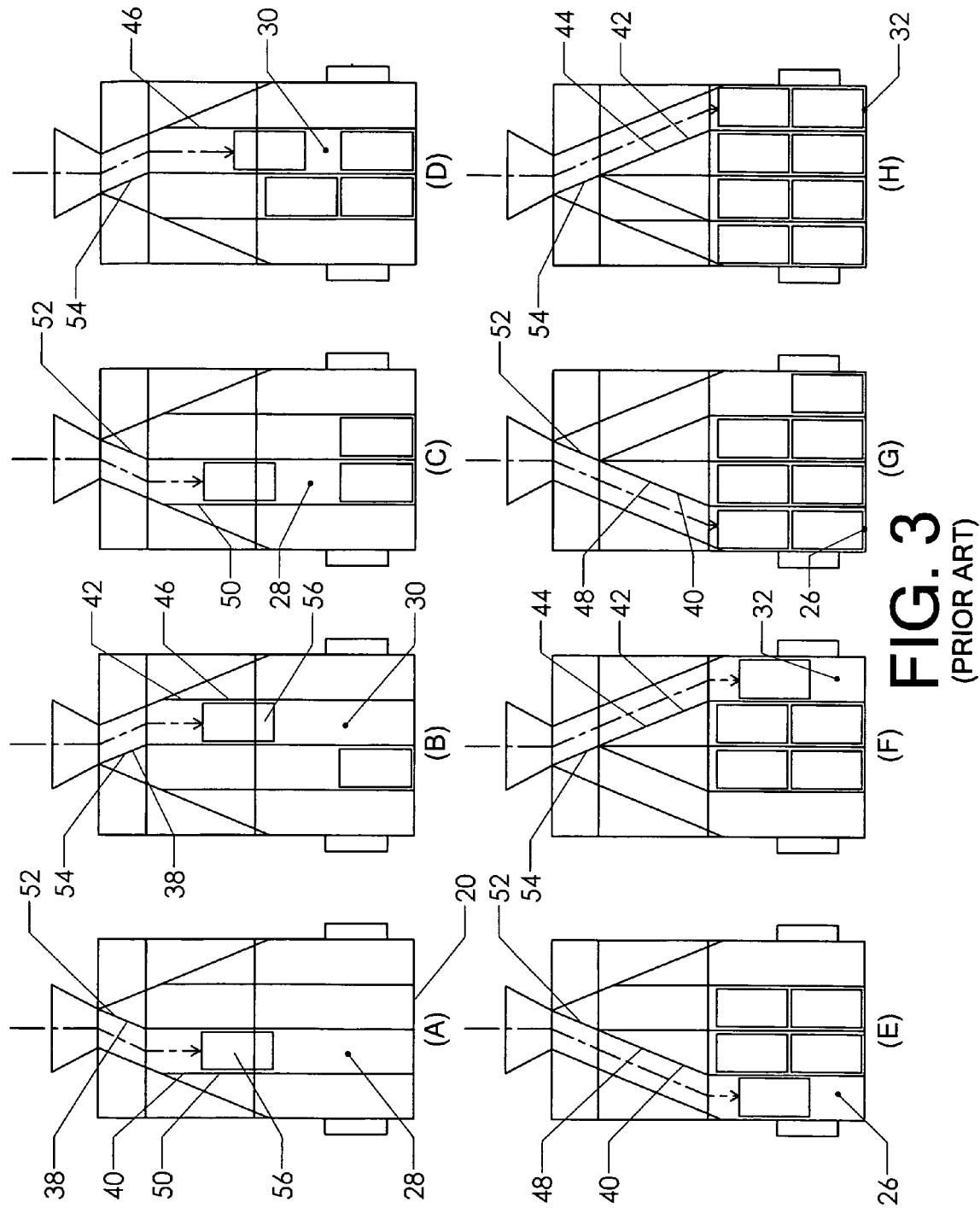
FIG. 3 is a sequential plan view, showing the accumulation of eight bales in a prior art bale accumulator.

| REFERENCE NUMERALS IN THE DRAWINGS | |
| --- | --- |
| 5 | hay bale |
| 7 | baling twine |
| 10 | bale accumulator |
| 12 | chassis |
| 14 | tow bar |
| 16 | castor wheel |
| 18 | main wheel |
| 20 | stop gate |
| 22 | pivot joint |
| 24 | input chute |
| 26 | first chute |
| 28 | second chute |
| 30 | third chute |
| 32 | fourth chute |
| 34 | forward bale sensor assembly |
| 35 | sensor arm |
| 36 | rear bale sensor assembly |
| 38 | primary gate |
| 40 | left gate |
| 42 | right gate |
| 44 | closed position |
| 46 | open position |
| 48 | closed position |
| 50 | open position |
| 52 | right position |
| 54 | left position |
| 56 | bale |

-continued

REFERENCE NUMERALS IN THE DRAWINGS

| | |
|---|---|
| 57 | towing vehicle |
| 58 | left guide |
| 59 | hitch |
| 60 | right guide |
| 62 | swing gate |
| 64 | swing gate |
| 66 | pivot joint |
| 68 | pivot joint |
| 70 | latch |
| 72 | latch mounting frame |
| 74 | latch bolt |
| 76 | pivot joint |
| 78 | compressor plate |
| 80 | angled bale receiver |
| 82 | angled bale receiver |
| 84 | spring post |
| 86 | return spring |
| 88 | central divider |
| 90 | rear crossmember |
| 92 | slanted wall |
| 93 | inboard rear corner |
| 94 | rear wall |
| 96 | side wall |
| 98 | swing gate tip |
| 100 | rear bale |
| 102 | forward bale |
| 104 | middle bale |
| 106 | ten stack |
| 108 | gate assembly |
| 110 | long side |
| 112 | short side |
| 114 | trailing pivot joint |

DETAILED DESCRIPTION OF THE INVENTION

Figure 4:
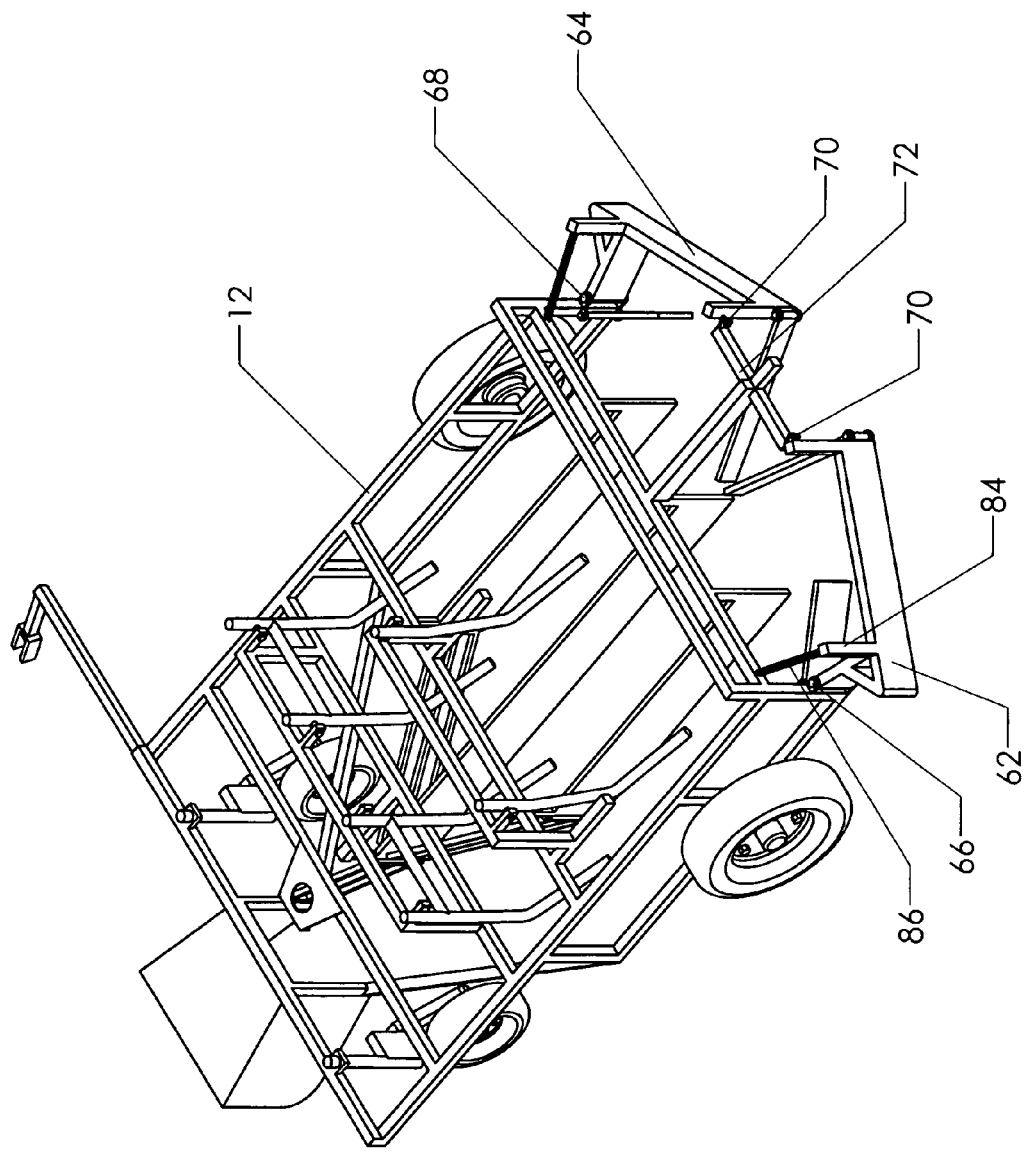
FIG. 4 is a perspective view, showing a bale accumulator made according to the present invention.

FIG. 4 shows a bale accumulator constructed according to the present invention. The rear of the accumulator is modified, with the balance of the accumulator preferably being the same as or similar to the prior art. The prior art input chutes, gates, and bale sensing assemblies can all be used. The novel features of the present invention reside primarily with a pair of pivoting gate assemblies which close the rear of the chutes.

Swing gate 62 pivots about pivot joint 66 on the left rear of chassis 12. Likewise, swing gate 64 pivots about pivot joint 68 on the right rear of chassis 12. Each swing gate is preferably urged toward its closed position (the position shown) by a return spring 68. The return springs are connected to a spring post 84 located on each swing gate. The two swing gates are held in the closed position by the engagement of a pair of latches 70 with latch mounting frame 72.

As discussed previously, the bottom of the accumulator is open. The hay bales it collects are not lifted off the ground but rather dragged along the ground by the accumulator (until released). The friction between the bales and the ground urges the bales rearward with respect to the accumulator. Thus, the bales will tend to bear against the two closed swing gates and will tend to force the swing gates open.

Figure 5:
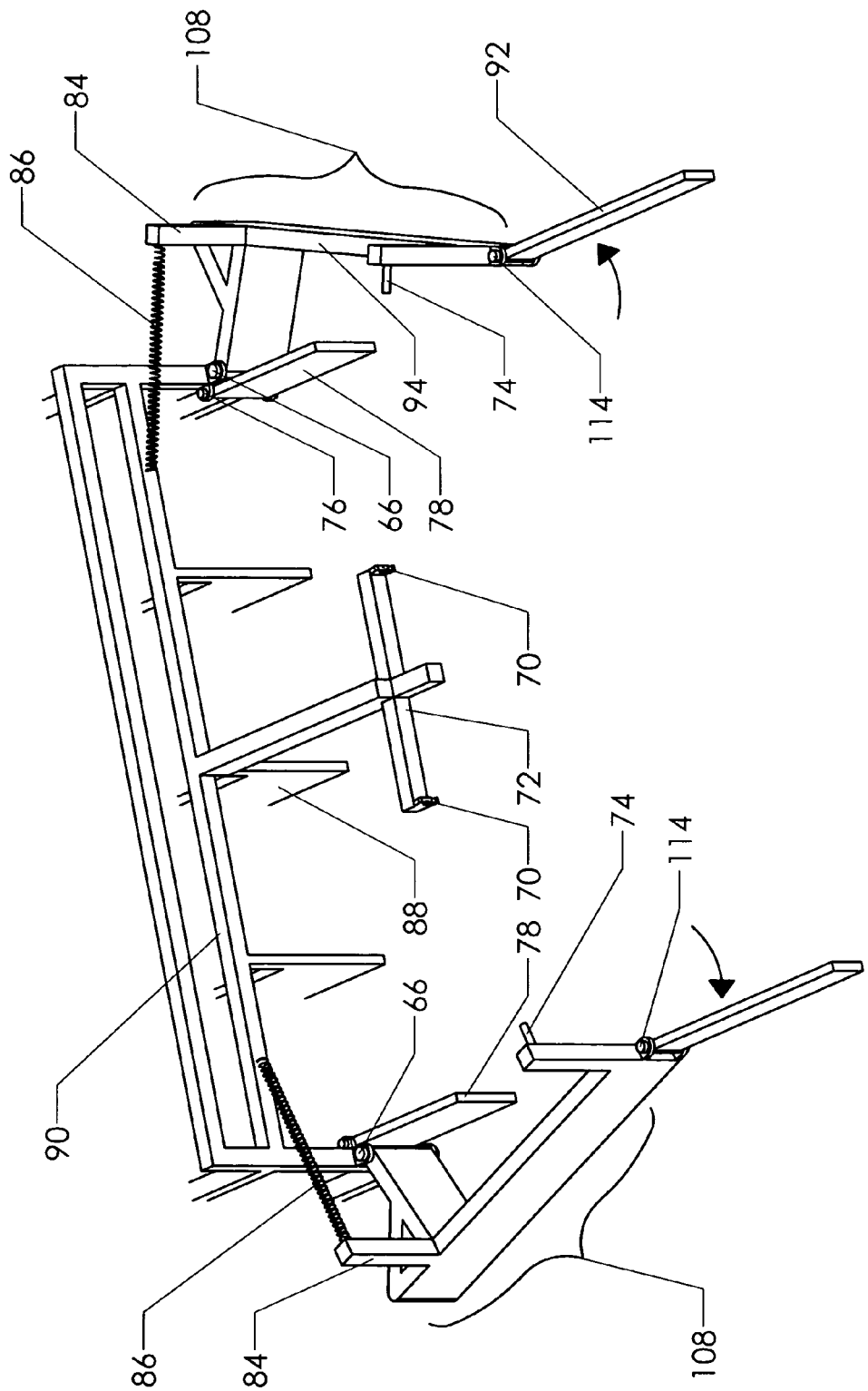
FIG. 5 is a detailed perspective view, showing the gate assemblies on the bale accumulator of FIG. 4.

FIG. 5 shows the two swing gate assemblies pivoted into the open position. The outward motion of the gate assemblies is denoted by the arrows in the view. Rear cross member 90 spans the rear of the chassis. Latch mounting frame 72 is connected to the rear cross member. Central divider 88 descends from the latch mounting frame and serves to divide the second and third chutes. A pair of latches 70 are preferably mounted on the latch mounting frame. These are positioned to engage a pair of corresponding latch bolts 74 on the two gate assemblies 108.

The reader will observe how the left gate assembly 108 pivots about a pivot joint 66 located on the left rear of the chassis. Likewise, the right gate assembly 108 pivots about a pivot joint 66 located on the right rear of the chassis. In the open position shown, the reader will observe how the two return springs 86 are stretched and thereby provide a restoring force.

The two gate assemblies are not rigid pieces. The trailing portion of each assembly includes a trailing pivot joint 114. Each trailing pivot joint pivotally attaches a slanted wall 92, so that the slanted wall can pivot with respect to rear wall 94.

FIG. 5 also shows a pair of compressor plates 78. The right compressor plate 78 pivots about pivot joint 76 on the right rear of the chassis. It includes a return spring which tends to bias the compressor plate inward to close the rear of the fourth chute (The return spring is internal and is not shown in the view). The left side of the chassis also includes a pivoting compressor plate 78, which is positioned to close the exit of the first chute.

Figure 6:
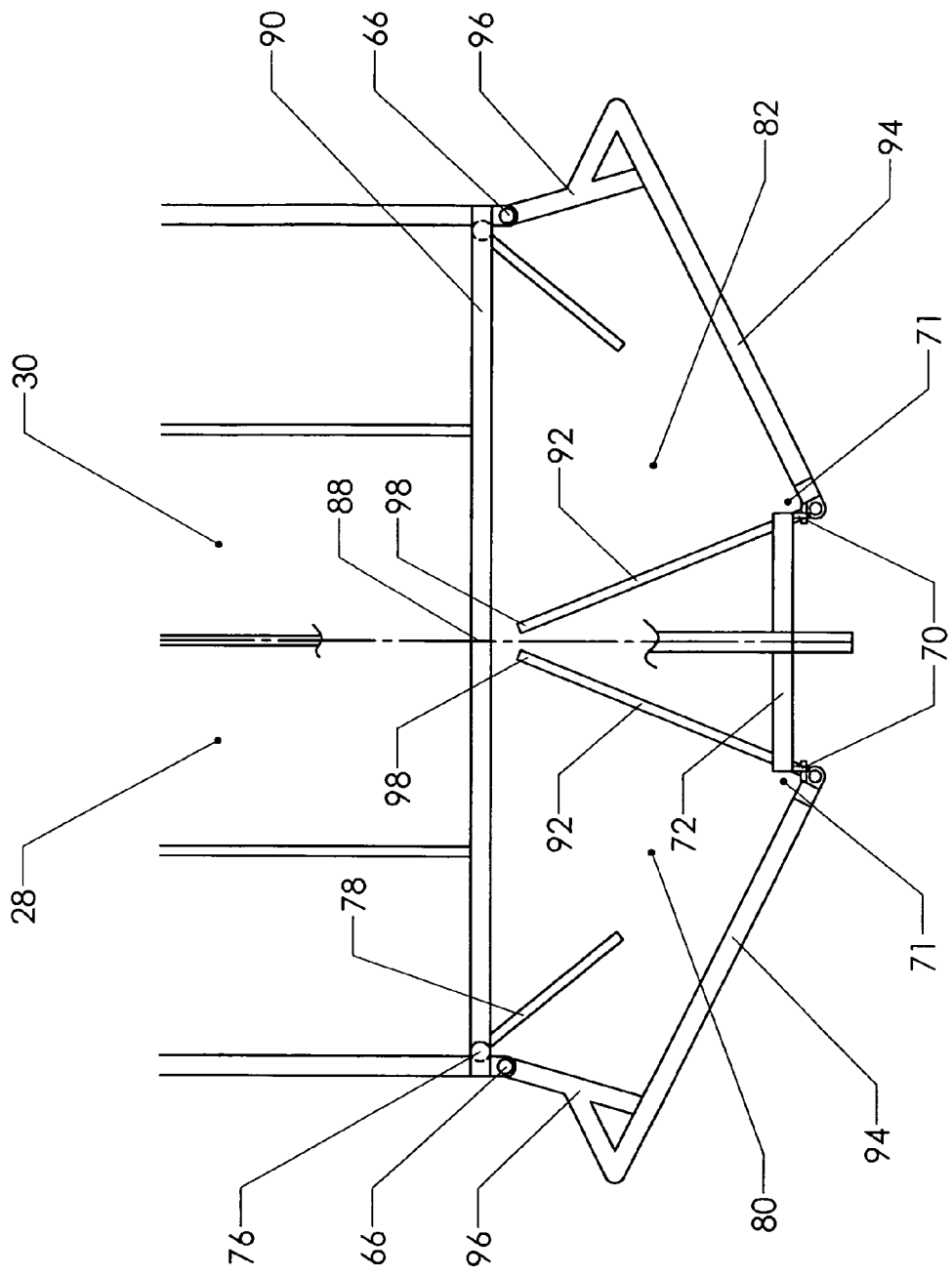
FIG. 6 is a detailed elevation view, showing the gate assemblies on the bale accumulator of FIG. 4.

FIG. 6 shows a plan view of the two gate assemblies in the closed position. The two compressor plates 78 are likewise shown in the position they occupy when unloaded. They partially obstruct the open rear of the four chutes. The closed gate assemblies create a pair of angled bale receivers—designated as angled bale receiver 80 and angled bale receiver 82.

The reader will observe that each gate assembly preferably includes three distinct wall portions. These are side wall 96, rear wall 94, and slanted wall 92. Each slanted wall 92 ends in a swing gate tip 98 which preferably lies adjacent to central divider 88. The two latches 70 are preferably located near the junction of a slanted wall and a rear wall. The reader will observe that each junction between a slanted wall and a rear wall creates an inside corner 71.

Figure 7:
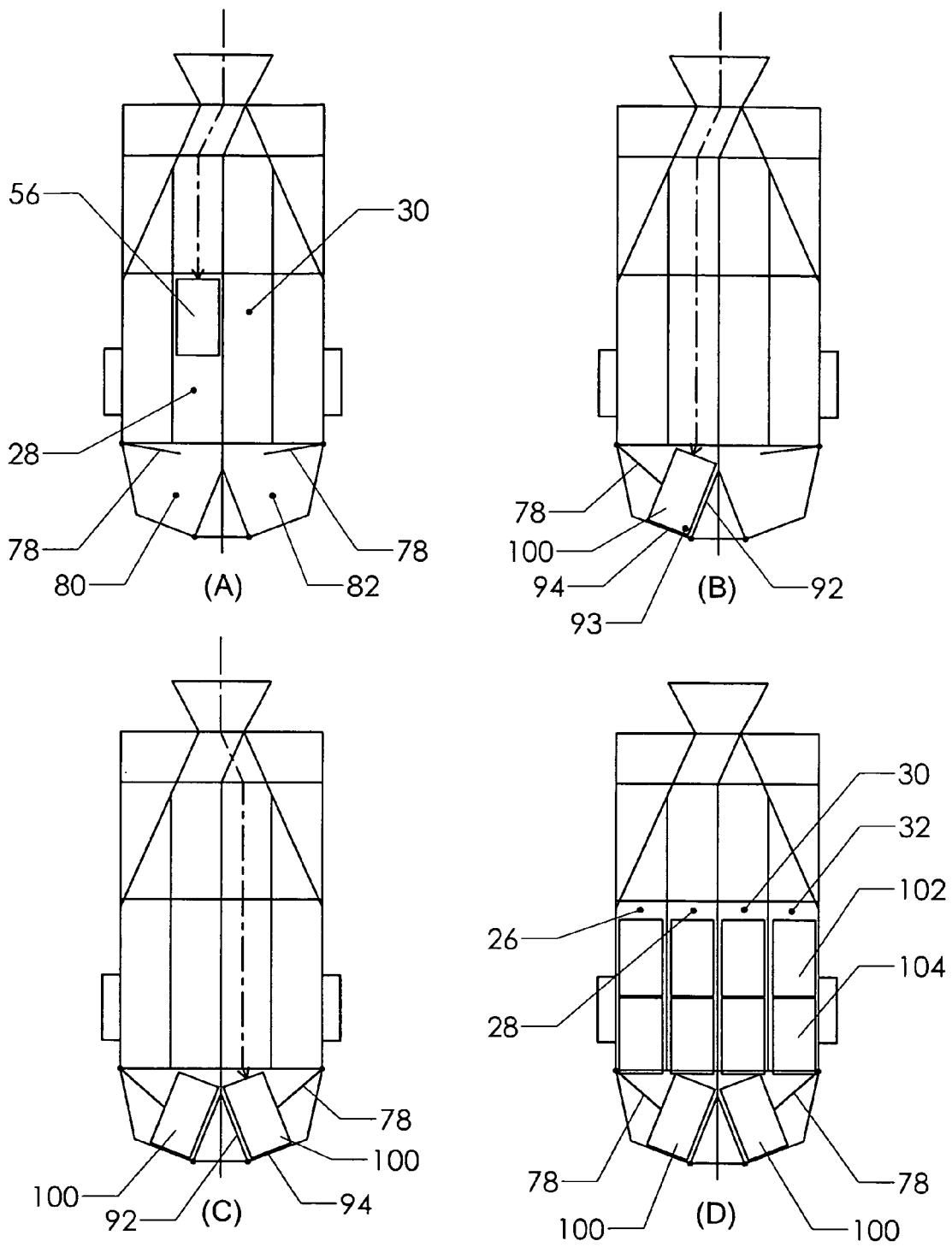
FIG. 7 is a sequential plan view, showing the accumulation of ten bales in a bale accumulator.

FIG. 7 shows how angled bale receiver 80 and angled bale receiver 82 may be loaded with hay bales. In FIG. 7(A), the accumulator is moving along the ground and a first bale 56 has been taken into the input chute and directed by the gates (as in the prior art) into second chute 78. As it exits the second chute it bears against the exposed end of compressor plate 78, which urges the bale against central divider 88 and slanted wall 92 of the left gate assembly. In FIG. 7(B) the first bale has slipped past the left compressor plate and come to rest against slanted wall 92 and rear wall 94. The reader will observe how inboard rear corner 93 of the bale rests within inside corner 71 formed by the intersection of slanted wall 92 and rear wall 94. The compressor plate helps to ensure that the bale remains in this position. Those skilled in the art will recognize that the orientation of slanted wall 92 has reoriented the bale by rotating its long side in a clockwise direction.

FIG. 7(C) shows the accumulation of a second bale. The prior art gate and chute mechanisms have directed this second bale into third chute 30. As it exits the rear of the third chute, the right compressor plate 78 urges it against the slanted wall of the right gate assembly. The second bale comes to rest against the rear wall of the right gate assembly. The reader will observe how the slanted wall has rotated the long side of this second bale in an anticlockwise direction.

The first and second bales are then dragged along inn the position shown in FIG. 7(C) as additional bales are accumulated. The order in which the additional bales are accumulated is not significant to the present invention. If a total of ten bales are desired before discharging the cluster, then two bales should be accumulated in each of the four chutes. This arrangement is shown in FIG. 7(D). A first set of four middle bales 104 are accumulated in the rearward position of the chutes while a second set of forward bales 102 are accumulated in the forward position. The two bales in the angled bale receivers are denoted as rear bales 100.

Figure 8:
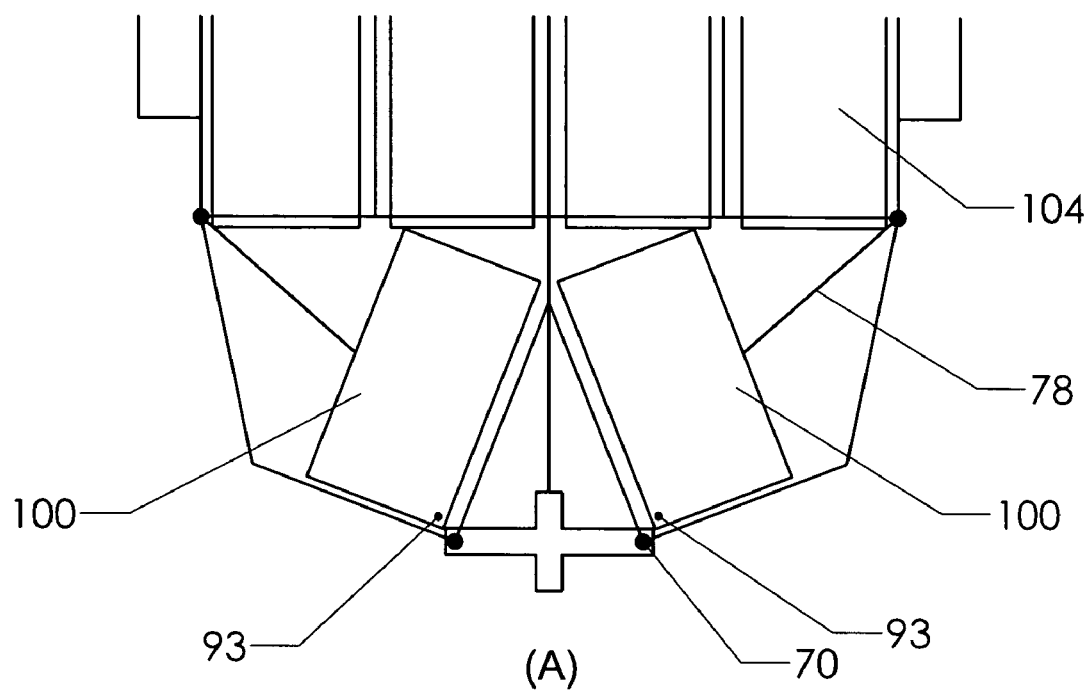
FIG. 8 is a sequential plan view, showing the release cycle of the bale accumulator.
Figure 8:
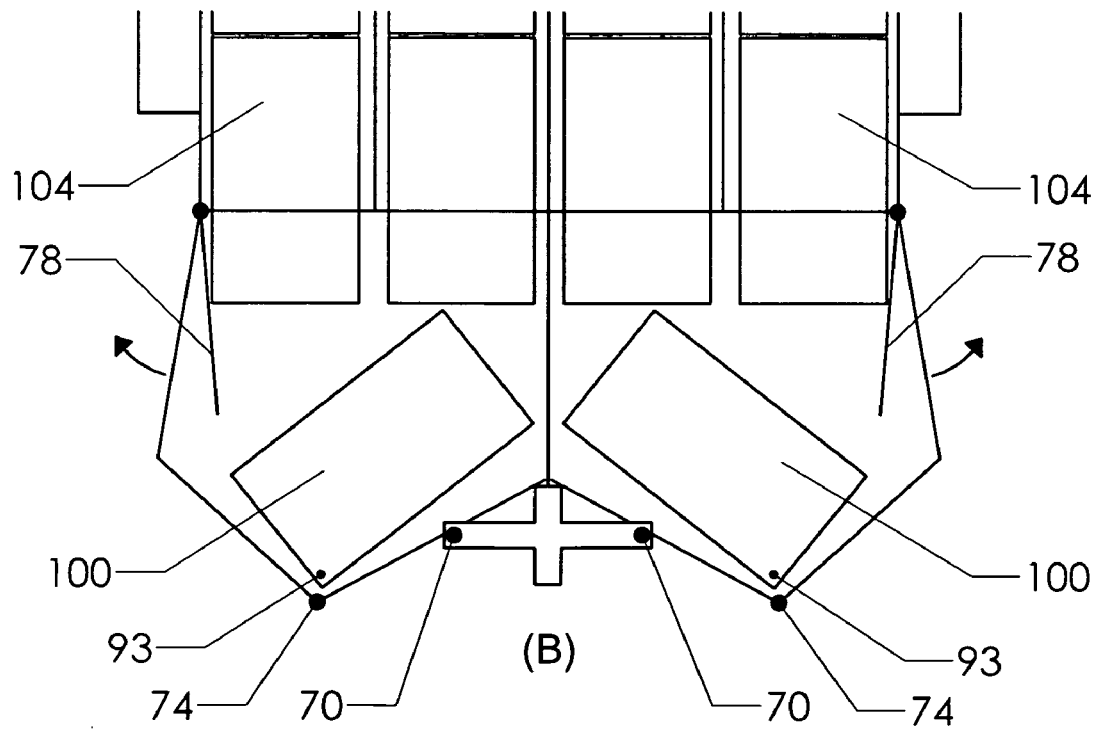
Figure 9:
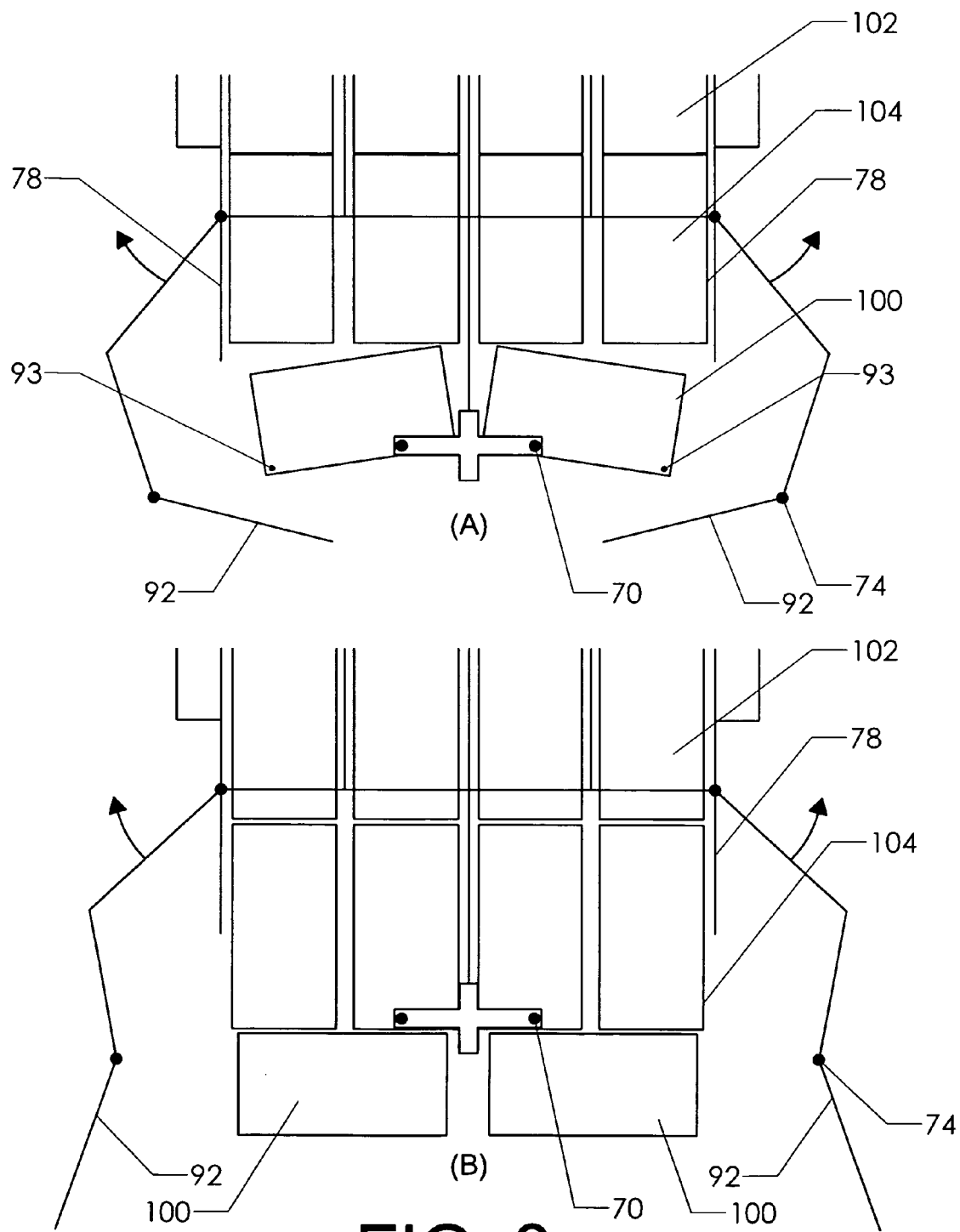
FIG. 9 is a sequential plan view, showing the release cycle of the bale accumulator.

The sequence of events in discharging the "ten-stack" cluster will now be described with reference being made to FIGS. 8-10. FIG. 8(A) shows a detailed plan view of the two rear bales 100 just prior to the initiation of the discharge cycle. The reader will observe how the two bales are engaged within the respective angled bale receivers. The two compressor plates 78 hold the bales in position. Those skilled in the art will realize that the dragging action of the bales along the ground would tend to hold the two rear bales in the position shown even without the compressor plates. However, the use of the compressor plates is preferable since they tend to positively locate the rear bales as the chassis goes through a turn, passes over undulations, etc.

The prior art bale sensor assemblies are used to detect the presence of all the desired bales prior to the initiation of the discharge cycle. As for the prior art, the detection can be accomplished via any desirable sensing means, with the preferred approach being the use of purely mechanical linkages.

The discharge cycle commences when the two latches 70 are unlatched. The rearward force exerted by the bales being dragged along the ground then acts to open the two rear gate assemblies. FIG. 8(B) shows the two rear gate assemblies as they just begin to swing open. The reader will observe how the two inboard rear corners 93 of each of the two rear bales remain engaged with the pivoting gate assemblies. The pivoting of the left gate assembly tends to rotate the left bale in a clockwise direction while the pivoting of the right gate assembly tends to rotate the right bale in an anticlockwise direction.

Each inboard rear corner 93 is formed by the intersection of a rear wall 94 and a slanted wall 92. The connection between the two walls is actually made by a trailing pivot joint 114. An actuator is provided to regulate the angle between each rear wall and slanted wall and to increase the angle as the gate assembly opens. This actuator can assume many forms, but is preferably a mechanical linkage. The reader will observe in comparing the transition from FIG. 8(A) to FIG. 8(B) how the slanted wall on the right gate assembly has rotated counterclockwise with respect to the rear wall. The results is that as the entire gate assembly opens outward the rear walls open outward a bit faster than the gate assembly as a whole. The angle found at inboard rear corner 93 in FIG. 8(B) is larger than the same angle in FIG. 8(A), which is a result of this action.

As the two rear bales move toward the rear, the set of middle bales 104 also slides toward the rear. Compressor plates 78 act to retain all the bales in the orientation shown and provide a smooth exit from the chassis. FIG. 9(A) shows the process as the two gate assemblies swing further open. The two rear bales 100 are further rotated so that their long sides lie almost perpendicular to the long sides of the bales exiting the chutes. Each slanted wall 92 has rotated further with respect to the rear wall to which it is pivotally connected. The rear bales exiting the first and fourth chutes have now rotated the two compressor plate 78 outward to the position shown. All eight bales within the chutes then slide to the rear in unison.

In FIG. 9(B), the two rear bales are seen as they exit the gate assemblies. The two swing gate tips 98 swing free of the of the two rear bales. The two compressor plates urge the exiting bales inward to form a tighter cluster. The two slanted walls 92 have rotated even further outward so that they clear the bales exiting the rear of the accumulator.

Figure 10:
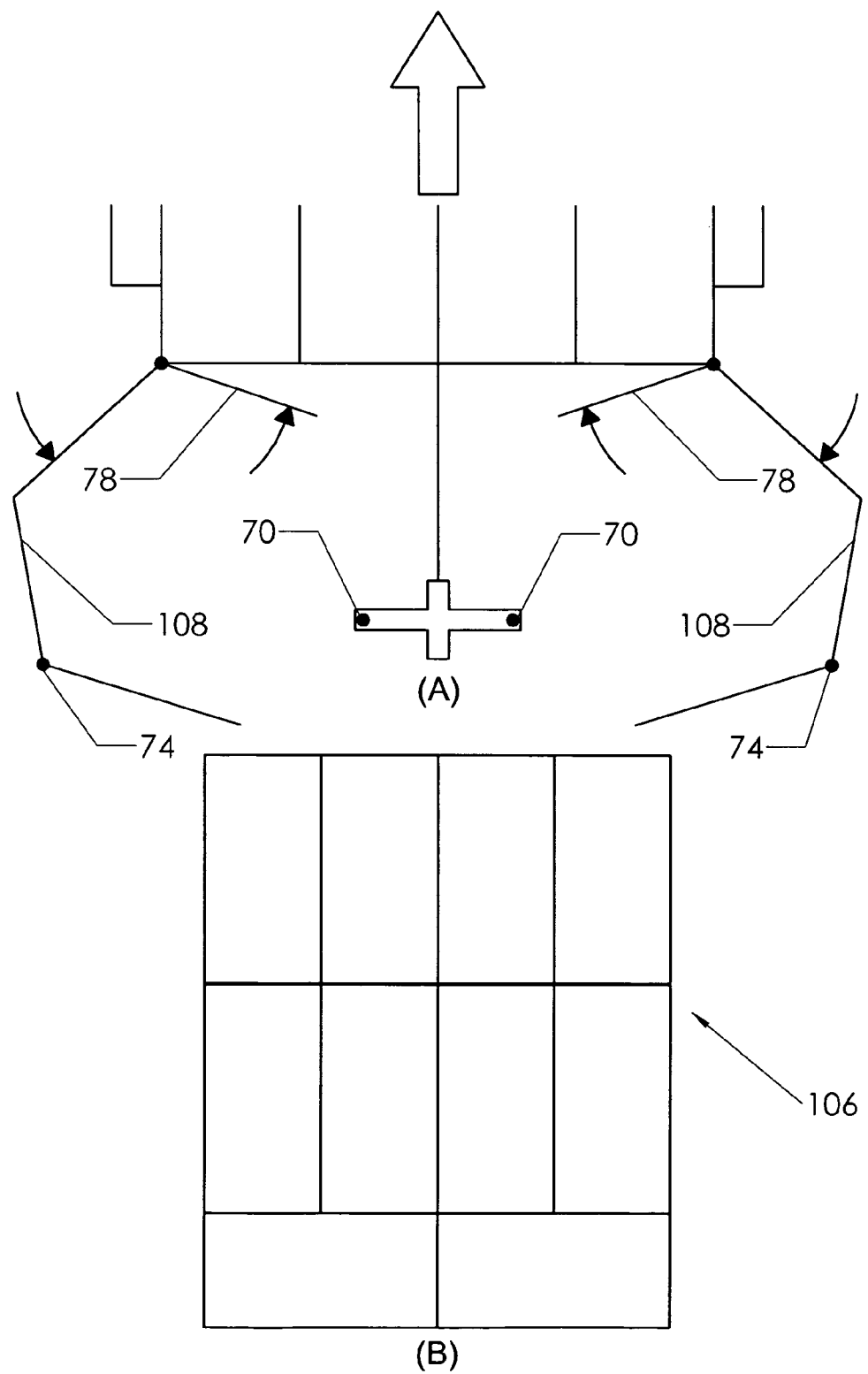
FIG. 10 is a plan view, showing more of the release cycle.

In FIG. 10 all ten bales have exited the rear of the gate assemblies. As soon as the swing gate tips 98 clear the most forward bales, the pair of return springs 86 urges the two gate assemblies back toward the closed position. As the gate assemblies swing closed the two latches reengage and the accumulator is ready for the next accumulation cycle. The entire process shown from FIGS. 8 through 10 is preferably performed rapidly, with the discharge cycle taking between 3 and 5 seconds.

Although the preceding description contains significant detail, it should not be construed as limiting the scope of the invention but rather as providing illustrations of the preferred embodiments of the invention. As an example, although the invention has been illustrated with respect to the accumulation of a "ten-stack" of hay bales, it could perform just as well in the creation of a cluster of six bales (where only a single bale would be accumulated in each of the four chutes). The invention could also be made to function with a chassis accumulating more than ten bales. Likewise, the order of the operations presented should not be deemed particularly significant except where specified to be significant. Thus, the scope of the invention should be fixed by the following claims rather than any specific examples provided.

Having described my invention, I claim:

1. A method for accumulating hay bales into an ordered cluster, each of said hay bales having a long side and a short side, said method comprising:
    a. providing a bale accumulator having
        i. a chassis having a front and a rear, said chassis capable of moving in a direction of travel,
        ii. a first chute, a second chute, a third chute, and a fourth chute within said chassis, with each of said first through fourth chutes having a rear opening,
        iii. a first bale receiver lying to the rear of said first and second chutes,
        iv. a second bale receiver lying to the rear of said third and fourth chutes;
    b. accumulating one of said hay bales in each of said first and second bale receivers;
    c. accumulating two of said hay bales in each of said first through fourth chutes, wherein each of said hay bales within said first through fourth chutes is oriented such that said long side of each of said hay bales lies approximately parallel to said direction of travel of said chassis;
    d. rotating said hay bales in each of said first and second bale receivers so that said long sides of said hay bales in each of said first and second bale receivers lie approximately transverse to said long sides of said hay bales within said first through fourth chutes;
    e. releasing all of said hay bales out said rear of said chassis;
    f. providing said bale accumulator with a first pivoting gate assembly closing said first bale receiver;
    g. providing said bale accumulator with a second pivoting gate assembly closing said second bale receiver; and
    h. wherein said step of rotating said hay bales in each of said first and second bale receivers so that said long sides of said hay bales in each of said first and second bale receivers lie approximately transverse to said long sides of said hay bales within said first through fourth chutes is at least partially carried out by unlatching said first and second pivoting gate assemblies, and pivoting said first and second gate assemblies outward with respect to said chassis.

2. A method for accumulating hay bales as recited in claim 1, further comprising:
    a. wherein said chassis has a left side, a right side, and a central divider;

b. wherein said first pivoting gate assembly pivots about a first pivot joint mounted proximate said left side of said chassis and said rear of said chassis; and c. wherein said second pivoting gate assembly pivots about a second pivot joint mounted proximate said right side of said chassis and said rear of said chassis.

3. A method for accumulating hay bales as recited in claim 2., further comprising:

a. wherein said chassis has a central divider;

b. providing said first pivoting gate. assembly with a first slanted wall having a first swing, gate tip and a first inside corner;

c. wherein when said first pivoting gate assembly is closed said first swing gate tip lies proximate said central divider and said first inside corner lies distal to said central divider;

d. providing said second pivoting gate assembly with a second slanted wall having a second swing gate tip and a second inside corner; and.

e. wherein when said second pivoting gate assembly is closed said second swing gate tip lies proximate said central divider and said second inside corner lies distal to said central divider.

4. A method for accumulating hay bales as recited in claim 3, further comprising:

a. positioning said first slanted wall so that a hay bale exiting said second chute is rotated less than ninety degrees as it encounters said first slanted wall such that a rear extreme of said bale moves toward said left side of said chassis and an inboard rear corner of said bale comes to rest in said first inside corner; and b. positioning said second slanted wall so that a hay bale exiting said third chute is rotated less than ninety degrees as it encounters said second slanted wall such that a rear extreme of said bale moves toward said right side of said chassis and an inboard rear corner of said bale comes to rest in said second inside corner.

5. A method for accumulating hay bales as recited in claim 4, further comprising:

a. as said first gate assembly opens, continuing to rotate a bale bearing against said first slanted wall by the engagement of said first inside corner with said inboard rear corner of said bale and said first slanted wall with said long side of said bale; and b. as said second gate assembly opens, continuing to rotate said bale bearing against said second slanted wall by engagement of said second inside corner with said inboard rear corner of said bale and said second slanted wall with said long side of said bale.

6. A method for accumulating hay bales as recited in claim 3, further comprising:

a. providing a first compression plate pivotally mounted on said left side of said chassis, wherein said first compression plate is configured to urge any of said hay bales coming into contact with said first pressure plate toward said central divider; and b. providing a second compression plate pivotally mounted on said right side of said chassis, wherein said second compression plate is configured to urge any of said hay bales coming into contact with said second pressure plate toward said central divider.

7. A method for accumulating hay bales as recited in claim 1, wherein:

a. all bales accumulated by said bale accumulator are dragged along the ground as said bale accumulator moves along in said direction of travel, with the frictional forces between said bales and said ground tending to urge said bales toward said rear of said chassis, thereby creating a force exerted by said bales tending to open said first and second pivoting gate assemblies; and b. said force exerted by said bales is used to open said first and second pivoting gate assemblies when said first and second pivoting gate assemblies are unlatched.

8. A method for accumulating hay bales as recited in claim 7, further comprising:

a. providing said first pivoting gate assembly with a first return spring tending to close said first pivoting gate assembly; and b. providing said second pivoting gate assembly with a second return spring tending to close said second pivoting gate assembly.

9. A method for accumulating hay bales into an ordered cluster, each of said hay bales having a long side and a short side, said method comprising:

a. providing a bale accumulator having i. a chassis having a front and a rear, said chassis capable of moving in a direction of travel, ii. a first chute, a second chute, a third chute, and a fourth chute within said chassis, with each of said first through fourth chutes having a rear opening, iii. a first bale receiver lying to the rear of said first and second chutes, iv. a second bale receiver lying to the rear of said third and fourth chutes:

b. accumulating a first hay bale in said first bale receiver;

c. accumulating a second hay bale in said second bale receiver;

d. accumulating a third and fourth bale in said first chute, with said long sides of said third and fourth bales being approximately aligned with said direction of travel;

e. accumulating a fifth and sixth bale in said second chute, with said long sides of said fifth and sixth bales being approximately aligned with said direction of travel;

f. accumulating a seventh and eighth bale in said third chute, with said long sides of said seventh and eighth bales being approximately aligned with said direction of travel;

g. accumulating a ninth and tenth bale in said fourth chute, with said long sides of said ninth and tenth bale being approximately aligned with said direction of travel;

h. rotating said first and second hay bales in said first and second bale receivers so that said long sides of said first and second hay bales lie approximately transverse to said long sides of said hay bales within said first through fourth chutes;

i. releasing all of said hay bales out said rear of said chassis;

j. providing said bale accumulator with a first pivoting gate assembly closing said first bale receiver;

k. providing said bale accumulator with a second pivoting gate assembly closing said second bale receiver; and l. wherein said step of rotating said first and second hay bales in said first and second bale receivers so that said long sides of said first and second hay bales lie approximately transverse to said long sides of said hay bales within said first through fourth chutes hay bales is at least partially carried out by unlatching said first and second pivoting gate assemblies and pivoting said first and second gate assemblies outward with respect to said chassis.

10. A method for accumulating hay bales as recited in claim 9, further comprising:

a. wherein said chassis has a left side, a right side, and a central divider;

b. wherein said first pivoting gate assembly pivots about a first pivot joint mounted proximate said left side of said chassis and said rear of said chassis; and c. wherein said second pivoting gate assembly pivots about a second pivot joint mounted proximate said right side Of said chassis and said rear of said chassis.

11. A method for accumulating hay bales as recited in claim 10, further comprising:

a. wherein said chassis has a central divider;

b. providing said first pivoting gate assembly with a first slanted wall having a first swing gate tip and a first inside corner;

c. wherein when said first pivoting gate assembly is closed said first swing gate tip lies proximate said central divider and said first inside corner lies distal to said central divider;

d. providing said second pivoting gate assembly with a second slanted wall having a second swing gate tip and a second inside corner; and e. wherein when said second pivoting gate assembly is closed said second swing gate tip lies proximate said central divider and said second inside corner lies distal to said central divider.

12. A method for accumulating hay bales as recited in claim 11, further comprising:

a. positioning said first slanted wall so that as said first hay bale exits said second chute said first hay bale is rotated less than ninety degrees as it encounters said first slanted wall such that a rear extreme of said first hay bale moves toward said left side of said chassis and an inboard rear corner of said first hay bale comes to rest in said first inside corner; and b. positioning said second slanted wall so that as said second hay bale exits said third chute said second hay bale is rotated less than ninety degrees as it encounters said second slanted wall such that a rear extreme of said second hay bale moves toward said right side of said chassis and an inboard rear corner of said second hay bale comes to rest in said second inside corner.

13. A method for accumulating hay bales as recited in claim 12, further comprising:

a. as said first gate assembly opens, continuing to rotate said first bale bearing against said first slanted wall by the engagement of said first inside corner with said inboard rear corner of said first bale and said first slanted wall with said long side of said first bale; and b. as said second gate assembly opens, continuing to rotate said second bale bearing against said second slanted wall by engagement of said second inside corner with said inboard rear corner of said second bale and said second slanted wall with said long side of said second bale.

14. A method for accumulating hay bales as recited in claim 11, further comprising:

a. providing a first compression plate pivotally mounted on said left side of said chassis, wherein said first compression plate is configured to urge any of said hay bales coming into contact with said first pressure plate toward said central divider; and b. providing a second compression plate pivotally mounted on said right side of said chassis, wherein said second compression plate is configured to urge any of said hay bales coming into contact with said second pressure plate toward said central divider.

15. A method for accumulating hay bales as recited in claim 9, wherein:

a. all bales accumulated by said bale accumulator are dragged along the ground as said bale accumulator moves along in said direction of travel, with the frictional forces between said bales and said ground tending to urge said bales toward said rear of said chassis, thereby creating a force exerted by said bales tending to open said first and second pivoting gate assemblies; and b. said force exerted by said bales is used to open said first and second pivoting gate assemblies when said first and second pivoting gate assemblies are unlatched.

16. A method for accumulating hay bales as recited in claim 15, further comprising:

a. providing said first pivoting gate assembly with a first return spring tending to close said first pivoting gate assembly; and b. providing said second pivoting gate assembly with a second return spring tending to close said second pivoting gate assembly.

17. A method for accumulating hay bales into an ordered cluster, each of said hay bales having a long side and a short side, said method comprising:

a. providing a bale accumulator having
   i. a chassis having a front and a rear, said chassis capable of moving in a direction of travel,
   ii. a plurality of chutes, with each of said plurality of chutes having a rear opening,
   iii. a first bale receiver lying to the rear of said first and second chutes,
   iv. a second bale receiver lying to the rear of said third and fourth chutes;

b. accumulating one of said hay bales in each of said first and second bale receivers;

c. accumulating a plurality of hay bales said plurality of chutes wherein each of said plurality of chutes is oriented such that said long side of each of said hay bales lies approximately parallel to said direction of travel of said chassis;

d. rotating said hay bales in each of said first and second bale receivers so that said long sides of said hay bales in each of said first and second bale receivers lie approximately transverse to said long sides of said hay bales within said first through fourth chutes;

e. releasing all of said hay bales out said rear of said chassis;

f. providing said bale accumulator with a first pivoting gate assembly closing said first bale receiver;

g. providing said bale accumulator with a second pivoting gate assembly closing said second bale receiver; and h. wherein said step of rotating said first and second hay bales in said first and second bale receivers so that said long sides of said first and second hay bales lie approximately transverse to said long sides of said hay bales within said plurality of chutes is at least partially carried out by unlatching said first and second pivoting gate assemblies and pivoting said first and second gate assemblies outward with respect to said chassis.

* * * * *